(12) United States Patent
Kurian et al.

(10) Patent No.: US 9,120,965 B2
(45) Date of Patent: Sep. 1, 2015

(54) COMPOSITION AND METHOD FOR RECOVERING HYDROCARBON FLUIDS FROM A SUBTERRANEAN RESERVOIR

(75) Inventors: Pious Kurian, Missouri City, TX (US); Mingli Wei, Naperville, IL (US); Kin-Tai Chang, Sugar Land, TX (US)

(73) Assignee: Nalco Company, Naperville, IL (US)

( * ) Notice: Subject to any disclaimer, the term of this patent is extended or adjusted under 35 U.S.C. 154(b) by 649 days.

(21) Appl. No.: 13/359,596

(22) Filed: Jan. 27, 2012

(65) Prior Publication Data

US 2013/0192826 A1 Aug. 1, 2013

(51) Int. Cl.
*A47B 43/00* (2006.01)
*C09K 8/588* (2006.01)
*C09K 8/584* (2006.01)
*C09K 8/60* (2006.01)
*C09K 8/594* (2006.01)

(52) U.S. Cl.
CPC ............... *C09K 8/588* (2013.01); *C09K 8/594* (2013.01)

(58) Field of Classification Search
USPC ............... 166/279; 507/226, 225, 246, 261
See application file for complete search history.

(56) References Cited

U.S. PATENT DOCUMENTS

| | | | |
|---|---|---|---|
| 6,454,003 B1 * | 9/2002 | Chang et al. | 166/270 |
| 2003/0155122 A1 | 8/2003 | Chang et al. | |
| 2009/0260819 A1 | 10/2009 | Kurian et al. | |
| 2009/0264324 A1 | 10/2009 | Kurian et al. | |
| 2010/0234252 A1 | 9/2010 | Moradi-Araghi et al. | |
| 2010/0314114 A1 | 12/2010 | Moradi-Araghi et al. | |

OTHER PUBLICATIONS

International Search Report for PCT/US2013/022857 dated May 3, 2013.

* cited by examiner

*Primary Examiner* — Susannah Chung
*Assistant Examiner* — Atnaf Admasu
(74) *Attorney, Agent, or Firm* — Brinks Gilson & Lione; Eric D. Babych

(57) ABSTRACT

A composition comprising crosslinked expandable polymeric microparticles capable of hydrolysis at or below neutral pH and a method of modifying the permeability to water of a subterranean formation by introducing such compositions into the subterranean formation is disclosed and claimed. This invention further relates to compositions and methods for the recovery of hydrocarbon fluids from a subterranean reservoir or formation subjected to $CO_2$ or $CO_2$ Water Alternating Gas flooding at low pH and increases the mobilization and/or recovery rate of hydrocarbon fluids present in the subterranean formations.

10 Claims, 1 Drawing Sheet

Labile crosslinker

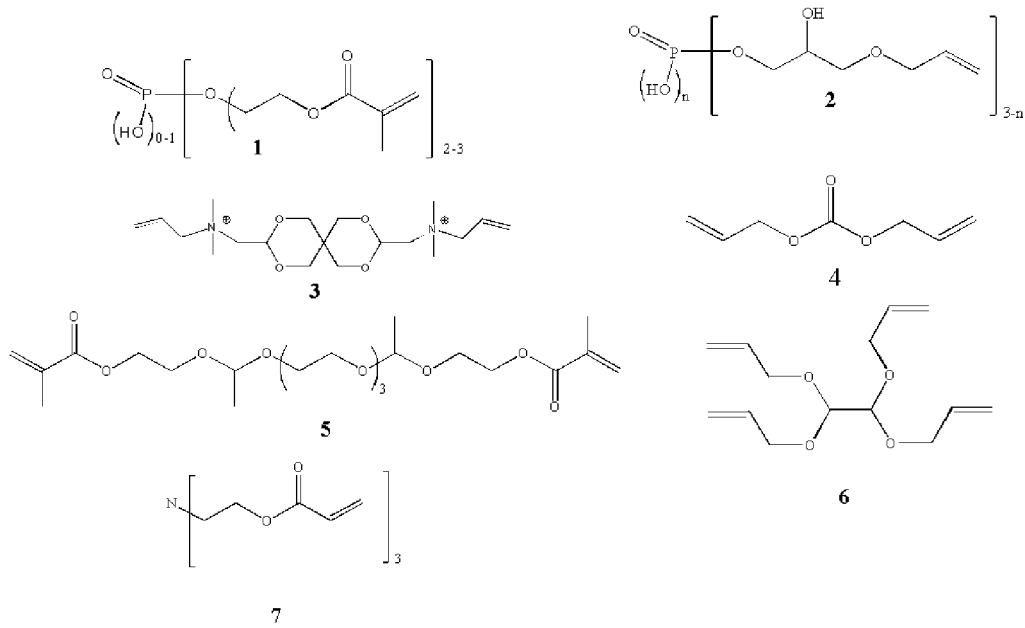

COMPOSITION AND METHOD FOR RECOVERING HYDROCARBON FLUIDS FROM A SUBTERRANEAN RESERVOIR

TECHNICAL FIELD

This invention relates generally to compositions and methods for the recovery of hydrocarbon fluids from a subterranean reservoir or formation. More specifically, the invention relates to compositions and methods for the recovery of hydrocarbon fluids from a subterranean reservoir or formation subjected to $CO_2$ or $CO_2$ Water Alternating Gas flooding. The invention has particular relevance to expandable crosslinked polymeric microparticle compositions that modify the permeability of subterranean formations at low pH and increase the mobilization and/or recovery rate of hydrocarbon fluids present in the subterranean formations.

BACKGROUND OF THE INVENTION

In the first stage of hydrocarbon recovery, the sources of energy present in the reservoir are allowed to move the oil, gas, condensate etc. to the producing wells(s) where they can flow or be pumped to the surface handling facility. A relatively small proportion of the hydrocarbon in place can usually be recovered by this means. The most widely used solution to the problem of maintaining the energy in the reservoir and ensuring that hydrocarbon is driven to the producing well(s) is to inject fluids down adjacent wells. This is commonly known as secondary recovery. The fluids normally used are water (such as aquifer water, river water, sea water, or produced water), or gas (such as produced gas, carbon dioxide, flue gas, and various others). If the fluid encourages movement of normally immobile residual oil or other hydrocarbon, the process is commonly termed tertiary recovery.

A prevalent problem with secondary and tertiary recovery projects relates to the heterogeneity of the reservoir rock strata. The mobility of the injected fluid is commonly different from the hydrocarbon and when it is more mobile various mobility control processes have been used to make the sweep of the reservoir more uniform and the consequent hydrocarbon recovery more efficient. Such processes have limited value when high permeability zones (commonly called thief zones or streaks) exist within the reservoir rock. The injected fluid has a low resistance route from the injection to the production well. In such cases, the injected fluid does not effectively sweep the hydrocarbon from adjacent lower permeability zones. When the produced fluid is reused, this can lead to fluid cycling through the thief zone to little, benefit and at great cost in terms of fuel and maintenance of the pumping system. As a result, numerous physical and chemical methods have been used to divert injected fluids out of thief zones in or near production and injection wells. When the treatment is applied to a producing well it is usually termed a water (or gas etc.) shutoff treatment. When its applied to an injection well it is termed a profile control or conformance control treatment.

In cases where the thief zone(s) are isolated from the lower permeability adjacent zones and when the completion in the well forms a good seal with the barrier such as a shale layer or "stringer") causing the isolation, mechanical seals or "plugs" can be set in the well to block the entrance of the injected fluid. If the fluid enters or leaves the formation from the bottom of the well, cement can also be used to fill up the well bore to above the zone of ingress. When the completion of the well allows the injected fluid to enter both the thief and the adjacent zones, such as when a casing is cemented against the producing zone and the cementing is poorly accomplished, a cement squeeze is often a suitable means of isolating the watered out zone.

Certain cases are that amenable to such methods by virtue of the fact that communication exists between layers of the reservoir rock outside the reach of cement. Typical examples of this issue include fractures or rubble zones or washed out caverns existing behind the casing. In such instances, chemical gels, capable of moving through pores in reservoir rock have been applied to seal off the swept out zones. When such methods fail, the remaining alternatives are to produce the well with poor recovery rate, sidetrack the well away from the prematurely swept zone, or abandon the well. Occasionally, the producing well is converted to a fluid injector to increase the field injection rate above the net hydrocarbon extraction rate and increase the pressure in the reservoir. This can lead to improved overall recovery but note is that the injected fluid will mostly enter the thief zone at the new injector and is likely to cause similar problems in nearby wells. All of the above are costly options.

Near wellbore conformance control methods generally fail when the thief zone is in widespread contact with adjacent hydrocarbon-containing lower permeability zones. The reason for this failure is that the injected fluids can bypass the treatment and reenter the thief zone having only contacted a very small proportion, or even none of the remaining hydrocarbon. It is commonly known in the art, that such near wellbore treatments are unsuccessful in significantly improving recovery in reservoirs having crossflow of the injected fluids between zones.

A few processes have been developed with the aim of reducing the permeability in a substantial portion of the thief zone or at a significant distance from the injection and production wells. One example of this is the deep diverting gel process is disclosed by Morgan et al. (UK Patent Application No. GB 2255360A). This technology has been used in the field and suffers from sensitivity to unavoidable variations in quality of the reagents which results in poor propagation. The gelant mixture is a two component formulation and it is believed that this characteristic contributed to poor propagation of the treatment into the formation.

The use of swellable cross-linked superabsorbent polymer microparticles for modifying the permeability of subterranean formations is disclosed in U.S. Pat. Nos. 5,465,792 and 5,735,349. However, swelling of the superabsorbent microparticles described therein is induced by changes of the carrier fluid from hydrocarbon to aqueous or from water of high salinity to water of low salinity. There thus exists an ongoing industrial need for novel methods to allow efficient propagation through the pore structure of hydrocarbon reservoir matrix rock with a particular need to modify the permeability of subterranean formations at low pH.

SUMMARY OF THE INVENTION

This invention accordingly provides novel polymeric microparticles in which the microparticle conformation is constrained by reversible (labile) internal crosslinks. The microparticle properties, such as particle size distribution and density of the constrained microparticle are designed to allow efficient propagation through the pore structure of hydrocarbon reservoir matrix rock, such as sandstone, carbonate, and other rocks found in subterranean formations. Unlike previous inventions, these polymers are targeted specifically for reservoirs that have undergone or are currently undergoing $CO_2$ for $CO_2$ Water Alternating Gas (WAG) flooding. The labile crosslinkers were specifically selected to hydrolyze under low pH conditions allowing the particle to expand by absorbing the injection fluid (normally water).

The ability of the particle to expand from its original size (at the point of injection) depends on the presence of conditions that induce the breaking of the labile crosslinker. Previous inventions in this area showed acrylate type labile crosslinkers gives very good performance when the reservoir is at or above neutral pH, whereas the present invention shows superior performance at or below neutral pH. The performance of these particles does not depend on the nature of the carrier fluid or the salinity of the reservoir water. The particles of this invention can propagate through the porous structure of the reservoir without using as designated fluid or fluid with salinity higher than the reservoir fluid. The expanded particle is engineered to have a particle size distribution and physical characteristics (e.g., particle rheology) which allows it to impede the flow of injected fluid in the pore structure. In doing so it is capable of diverting chase fluid into less thoroughly swept zones of the reservoir.

In an aspect, this invention is directed to a composition comprising highly crosslinked expandable polymeric microparticles having an unexpanded volume average particle size diameter of from about 0.05 to about 2,000 microns and a crosslinking agent content from about 50 to about 200,000 ppm of labile cross linkers and from 0 to about 300 ppm of non-labile cross linkers, based on molar ratio of total crosslinked polymeric microparticles.

In another aspect, this invention relates to a composition comprising crosslinked expandable polymeric microparticles having (i) an unexpanded volume average particle size diameter from about 0.05 to about 1 micron or from about 0.05 to about 2,000 microns and (ii) a crosslinking agent content from about 50 to about 200,000 ppm of at least one labile crosslinker capable of cleavage (e.g., hydrolysis) at or below neutral pH and from 0 to about 900 ppm of at least one non-labile crosslinker, based on a molar ratio. One or more of the crosslinkers may be a multifunctional crosslinker according to alternative embodiments. In an embodiment, at least a portion of the crosslinked expandable polymeric microparticles is highly crosslinked.

In another aspect, this invention provides a method of modifying the permeability to water of a subterranean formation. The method includes introducing into the subterranean formation a composition comprising crosslinked expandable polymeric microparticles having a smaller diameter than the pores of the subterranean formation and wherein labile crosslinkers in the crosslinked expandable polymeric microparticles break under the conditions in the subterranean formation to form expanded polymeric microparticles. In embodiments, from about 100 ppm to about 10,000 ppm, based on polymer actives and total amount of fluid injected into the subterranean formation, is added to the subterranean formation.

It is an advantage of the invention to provide a composition comprising particles of low viscosity and optimal size to allow the particles to propagate far from the injection point until encountering a high temperature zone in the subterranean formation, unlike conventional blocking agents, such as polymer solutions and polymer gels that cannot penetrate far and deep into the subterranean formation.

It is another advantage of the invention to provide polymeric microparticles of a highly crosslinked nature that do not expand in solutions of different salinity resulting in a dispersion that is not affected by the salinity of the fluid encountered in a subterranean formation and obviating the need for a special carrier fluid during treatment.

It is a further advantage of the invention to provide polymeric microparticles with a tunable expansion rate based upon the type of crosslinkers used and conditions within the subterranean formation.

It is yet another advantage, of the invention to provide expandable highly crosslinked polymeric microparticles with enhanced low pH functionality, The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims

BRIEF DESCRIPTION OF THE DRAWINGS

FIG. 1 shows illustrative examples of labile crosslinkers useful in the present invention.

DETAILED DESCRIPTION OF THE INVENTION

The following definitions are intended to be clarifying and are not intended to be limiting.

"Amphoteric polymeric microparticle" means a crosslinked polymeric microparticle containing both cationic substituents and anionic substitutents, although not necessarily in the same stoichiometric proportions. Representative amphoteric polymeric microparticles include terpolymers of nonionic monomers, anionic monomers and cationic monomers as defined herein. Preferred amphoteric polymeric microparticles have a higher than 1:1 anionic monomer/cationic monomer mole ratio.

"Ampholytic ion pair monomer: means the acid-base salt of basic, nitrogen containing monomers such as dimethylaminoethylacrylate (DMAEA), dimethylaminoethyl methacrylate (DMAEM), 2-methacryloyloxyethyldiethylamine, and the like and acidic monomers such as acrylic acid and sulfonic acids such as 2-acrylamido-2-methylpropane sulfonic acid, 2-methacryloyloxyethane sulfonic acid, vinyl sulfonic acid, styrene sulfonic acid, the like, and combinations thereof.

"Anionic monomer" means a monomer as defined herein which possesses an acidic functional group and the base addition salts thereof. Representative anionic monomers include acrylic acid, methacrylic acid, maleic acid, itaconic acid, 2-propenoic acid, 2-methyl-2-propenoic acid, 2-acrylamido-2-methyl propane sulfonic acid, sulfopropyl acrylic acid and other water-soluble forms of these or other polymerizable carboxylic or sulphonic acids, sulphomethylated acrylamide, allyl sulphonic acid, vinyl sulphonic acid, the quaternary salts of acrylic acid and methacrylic acid such as ammonium acrylate and ammonium methacrylate, the like, and combinations thereof. Preferred anionic monomers include 2-acrylamido-2-methyl propanesulfonic acid sodium salt, vinyl sulfonic acid sodium salt and styrene sulfonic acid sodium salt. 2-Acrylamido-2-methyl propanesulfonic acid sodium salt is more preferred.

"Anionic polymeric in microparticle" means a cross-linked polymeric microparticle containing a net negative charge. Representative anionic polymeric microparticles include copolymers of acrylamide and 2-acrylamido-2-methyl propane sulfonic acid, copolymers of acrylamide and sodium acrylate, terpolymers of acrylamide, 2-acrylamido-2-methyl propane sulfonic acid and sodium acrylate and homopolymers of 2-acrylamido-2-methyl propane sulfonic acid. Preferred anionic polymeric microparticles are prepared from about 95 to about 10 mole percent of nonionic monomers and from about 5 to about 90 mole percent anionic monomers. More preferred anionic polymeric microparticles are prepared from about 95 to about 10 mole percent acrylamide and from about 5 to about 90 mole percent 2-acrylamido-2-methyl propane sulfonic acid.

"Betaine-containing polymeric microparticle" means a cross-linked polymeric microparticle prepared by polymerizing a betaine monomer and one or more nonionic monomers.

"Betaine monomer" means a monomer containing cationically and anionically charged functionality in equal proportions, such that the monomer is net neutral overall. Representative betaine monomers include N,N-dimethyl-N-acryloyloxyethyl-N-(3-sulfopropyl)-ammonium betaine, N,N-dimethyl-N-methacryloyloxyethyl-N-(3-sulfopropyl)-ammonium betaine, N,N-dimethyl-N-acrylamidopropyl-N-carboxymethyl)-ammonium betaine, N,N-dimethyl-N-acrylamidopropyl-N-(2-carboxymethyl)-ammonium betaine, N,N-dimethyl-N-acryloxyethyl-N-(3-sulfopropyl)-ammonium betaine, N,N-dimethyl-N-acrylamidopropyl-N-(2-carboxymethyl)-ammonium betaine, N-3-sulfopropylvinylpyridine ammonium betaine, 2-(methylthio)ethyl methacryloyl-S-(sulfopropyl)-sulfonium betaine, 1-(3-sulfopropyl)-2-vinylpyridinium betaine, N-(4-sulfobutyl)-N-methyldiallylamine ammonium betaine (MDABS), N,N-diallyl-N-methyl-N-(2-sulfoethyl)ammonium betaine, the like, and combinations thereof. A preferred betaine monomer is N,N-dimethyl-N-methacryloyloxyethyl-N-(3-sulfopropyl)-ammonium betaine.

"Cationic Monomer" means a monomer unit as defined herein which possesses a net positive charge. Representative cationic monomers include the quaternary or acid salts of dialkylaminoalkyl acrylates and methacrylates such as dimethylaminoethylacrylate methyl chloride quaternary salt (DIMAEA.MCQ), dimethylaminoethylmethacrylate methyl chloride quaternary salt (DMAEM.MCQ), dimethylaminoethylacrylate hydrochloric acid salt, dimethylaminoethylacrylate sulfuric acid salt, dimethylaminoethyl acrylate benzyl chloride quaternary salt (DMAEA.BCQ) and dimethylaminoethylacrylate methyl sulfate quaternary salt; the quaternary or acid salts of dialkylaminoalkylacrylamides and methacylamides such as dimethylaminopropyl acrylamide hydrochloric acid salt, dimethylaminopropyl acrylamide sulfuric acid salt, dimethylaminopropyl methacrylamide hydrochloric acid salt and dimethylaminopropyl methacrylamide sulfuric acid salt, methacrylamidopropyl trimethyl ammonium chloride and acrylamidopropyl trimethyl ammonium chloride; and N,N-diallyldialkyl ammonium halides such as diallyldimethyl ammonium chloride (DADMAC). Preferred cationic monomers include dimethylaminoethylacrylate methyl chloride quaternary salt, dimethylaminoethylmethacrylate methyl chloride quaternary salt and diallyldimethyl ammonium chloride. Diallyldimethyl ammonium chloride is more preferred.

"Cross linking monomer" means an ethylenically unsaturated monomer containing at least two sites of ethylenic unsaturation which is added to constrain the microparticle conformation of the polymeric microparticles of this invention. The level of cross linking used in these polymer microparticles is high, compared to conventional super-absorbent polymers, to maintain a rigid non-expandable microparticle configuration. Cross linking monomers according to this invention include both labile crosslinking monomers and non-labile crosslinking monomers.

"Emulsion," "microemulsion," and "inverse emulsion" mean a water-in-oil polymer emulsion comprising a polymeric microparticle according to this invention in the aqueous phase, a hydrocarbon oil for the oil phase and one or more water-in-oil emulsifying agents. Emulsion polymers are hydrocarbon continuous with the water-soluble polymers dispersed within the hydrocarbon matrix. The emulsion polymers are optionally "inverted" or converted into water-continuous form using shear, dilution, and, generally an inverting surfactant (See U.S. Pat. No. 3,734,873).

"Ion-pair polymeric microparticle" means a cross-linked polymeric microparticle prepared by polymerizing an ampholytic ion pair monomer and one more anionic or nonionic monomers.

"Labile cross linking monomer" means a crosslinking monomer which can be degraded by certain conditions of heat and/or pfd, after it has been incorporated into the polymer structure, to reduce the degree of crosslinking in the polymeric microparticle of this invention. The aforementioned conditions are such that they can cleave bonds in the "crosslinking monomer" without substantially degrading the rest of the polymer backbone. In embodiments, the labile crosslinker comprises at least two functional sites. In other embodiments, the labile crosslinker comprises more than two functional sites. Representative labile crosslinking monomers that may be used in alternative embodiments of the invention are shown in FIG. 1. The labile crosslinking monomer is present in the crosslinked expandable polymeric microparticles of the invention in an amount from about 50 to about 200,000 ppm, preferably from about 50 to about 100,000 ppm and more preferably from about 50 to about 60,000 ppm, based on total weight of crosslinked polymer.

"Monomer" means a polymerizable allylic, vinylic or acrylic compound. The monomer may be anionic, cationic, nonionic, or zwitterionic. Vinyl monomers are preferred, and acrylic monomers are more preferred.

"Nonionic monomer" means a monomer as defined herein which is electrically neutral. Representative nonionic monomers include N-isopropylacrylamide, N,N-dimethylacrylamide, N,N-diethylacrylamide, dimethylaminopropyl acrylamide, dimethylaminopropyl methacrylamide, acryloyl morpholine, hydroxyethyl acrylate, hydroxypropyl acrylate, hydroxyethyl methacrylate, hydroxypropyl methacrylate, dimethylaminoacrylate (DMABA), dimethylaminoethyl methacrylate (DMAEM), maleic anhydride, N-vinyl pyrrolidone, vinyl acetate, and N-vinyl formamide. Preferred nonionic monomers include acrylamide, N-methylacrylamide, N,N-dimethylacrylamide and dimethalacrylamide. Acrylamide is more preferred.

"Non-labile cross linking monomer" means a cross linking monomer which is not degraded under the conditions of temperature and/or pH which would cause incorporated labile cross linking monomer to disintegrate. Non-labile crosslinking monomer is added, in addition to the labile crosslinking monomer, to control the expanded conformation of the polymeric microparticle. Representative non-labile crosslinking monomers include methylene bisacrylamide, diallylamine, triallylamine, divinyl sulfonic, diethyleneglycol diallyl ether, the like, and combinations thereof. A preferred non-labile crosslinking monomer is methylene bisacrylamide. The non-labile crosslinker is present in an amount from 0 to about 300 ppm, preferably from about 0 to about 200 ppm, and more preferably from about 0 to about 100 ppm based on a molar ratio of crosslinked polymeric microparticle, in the absence of a non-labile crosslinker, the polymer particle, upon complete scission of labile crosslinker, is converted into a mixture of linear polymer strands. The particle dispersion is thereby changed into a polymer solution. This polymer solution, due to its viscosity, changes the mobility of the fluid in a porous medium. In the presence of a small amount of non-labile cross linker, the conversion from particles to linear molecules is incomplete. The particles become a loosely linked network but retain certain "structure." Such structured particles can block the pore throats of porous media and create a blockage of flow.

In embodiments, the crosslinked expandable polymeric microparticle composition of the invention is prepared by free-radical polymerization from about 95 to about 10 mole percent of nonionic monomers and from about 5 to about 90 mole percent anionic monomers.

In a preferred embodiment of the invention, the polymeric microparticles are prepared using an inverse emulsion or microemulsion process to assure certain particle size range. The unexpanded volume average particle size diameter of the polymeric microparticle is preferably from about 0.05 to about 2,000 microns. In embodiments, the unexpanded volume average particle size diameter is from about 0.05 to about 10 microns. In other embodiments, the unexpanded volume average particle size diameter is from about 0.1 to about 3 microns, more preferably from about 0.1 to about 1 microns.

In an inverse emulsion or microemulsion process, an aqueous solution of monomers and crosslinkers is added to a hydrocarbon liquid containing an appropriate surfactant or surfactant mixture to thrift an inverse monomer microemulsion consisting of small aqueous droplets dispersed in the continuous hydrocarbon liquid phase and subjecting the monomer microemulsion to free radical polymerization. In addition to the monomers and crosslinkers, the aqueous solution may also contain other additives including chelating agents to remove polymerization inhibitors, pH adjusters, initiators, and other additives. The hydrocarbon liquid phase comprises as hydrocarbon liquid or mixture of hydrocarbon liquids. Saturated hydrocarbons or mixtures thereof are preferred. Typically, the hydrocarbon liquid phase comprises benzene, toluene, fuel oil, kerosene, odorless mineral spirits, the like, and mixtures of any of the foregoing. Surfactants useful in the microemulsion polymerization process described herein include, for example, sorbitan esters of fatty acids, ethoxylated sorbitan esters of fatty acids, the like, or any mixture or combination thereof. Preferred emulsifying agents include ethoxylated sorbitol oleate and sorbitan sesquioleate.

In embodiments, the expandable polymeric microparticle composition of the invention comprises at least one of the following properties: anionic, amphoteric, ion-pair, betaine-containing, and combinations thereof.

Polymerization of the emulsion may be carried out in any manner known to those skilled in the art. Initiation may be effected with a variety of thermal and redox free-radical initiators including azo compounds, such as azobisisobutyronitrile; peroxides, such as t-butyl peroxide; organic compounds, such as potassium persulfate and redox couples, such as sodium bisulfite/sodium bromate. Preparation of an aqueous product from the emulsion may be effected by inversion by adding it to water which may contain an inverting surfactant.

Alternatively, the polymeric microparticles cross linked with labile crosslinkers are prepared by internally crosslinking polymer particles which contain polymers with pendant carboxylic acid and hydroxyl groups. The crosslinking is achieved through ester formation between the carboxylic acid and hydroxyl groups. The esterification can be accomplished by azeotropic distillation (See e.g., U.S. Pat. No. 4,599,379) or thin film evaporation technique (See e.g., U.S. Pat. No. 5,589,525) for water removal. For example, a polymer microparticle prepared from inverse emulsion polymerization process using acrylic acid, 2-hydroxyethylacrylate, acrylamide and 2-acrylamido-2-methylpropanesulfonate sodium as monomer is converted into crosslinked polymer particles by the dehydration processes described above.

Representative preparations of cross-linked polymeric microparticles using microemulsion process are described in U.S. Pat. Nos. 4,956,400; 4,968,435; 5,171,508; 5,465,792; and 5,73,5439.

In embodiments, an aqueous suspension of the polymeric microparticles is prepared by redispersing the dry polymer in water.

In embodiments, this invention is directed to a method of modifying the permeability to water of a subterranean formation comprising injecting into the subterranean formation a composition comprising crosslinked polymeric microparticles. The microparticles have a crosslinking agent content from about 0.9 to about 20 mole percent (50 to 200,000 ppm by molar ratio of total crosslinked polymer) of labile crosslinkers and from 0 to about 300 ppm by molar ratio of total crosslinked polymer of non-labile crosslinkers. The microparticles generally have a smaller diameter than the pores of the subterranean formation and the labile crosslinkers break under the conditions of temperature and pH in the subterranean formation to form expanded microparticles. The composition then flows through one or more zones of relatively high permeability in the subterranean formation under increasing temperature conditions, until the composition reaches a location where the temperature or pH is sufficiently high to promote expansion of the microparticles. The nature of the crosslinks in the microparticles of the invention result in low viscosity and optimal size to allow the particles to propagate far from the injection point until encountering a high temperature zone in the subterranean formation, unlike conventional blocking agents, such as polymer solutions and polymer gels that cannot penetrate far and deep into the subterranean formation.

Also, the polymeric microparticles of this invention, due to their highly crosslinked nature, do not expand in solutions of different salinity. Consequently, the viscosity of the dispersion is not affected by the salinity of the fluid encountered in the subterranean formation and as a result no special carrier fluid is needed for treatment. Only after the particles encounter conditions sufficient to reduce the crosslinking density, is the fluid rheology changed to achieve the desired effect.

Among other factors, the reduction in crosslinking density is dependent on the rate of cleavage of the labile crosslinker. In particular, different labile crosslinkers, have different rates of bond cleavage at different temperatures. The temperature and mechanism depend on the nature of the crosslinking chemical bonds. For example, when the labile crosslinker is PEG diacrylate, hydrolysis of the ester linkage is the mechanism of de-crosslinking. Different alcohols have slightly different rates of hydrolysis. In general, methacrylate esters will hydrolyze at a slower rate than acrylate esters under similar conditions. With divinyl or diallyl compounds separated by an azo group such as the diallylamide of 2,2'-Azobis(isbutyric acid), the mechanism of de-crosslinking is elimination of a nitrogen molecule. As demonstrated by various azo initiators for free radical polymerization, different azo compounds indeed have different half-life temperatures for decomposition.

Without the intention of being theory bound, in addition to the rate of de-crosslinking it is believed that the rate of particle diameter expansion also depends on the total amount of remaining crosslinking. It has been observed that the particles expand gradually initially as the amount of crosslinking decreases. After the total amount of crosslinking passes below a certain critical density, the viscosity increases explosively. Thus, by proper selection of the labile crosslinker, both temperature- and time-dependent expansion properties can be incorporated into the polymer particles.

The particle size of the polymer particles before expansion is selected based on the calculated pore size of the highest permeability thief zone. The crosslinker type and concentration, and hence the time delay before the injected particles begin to expand, is based on the temperature both near the injection well and deeper into the subterranean formation, the expected rate of movement of injected particles through the thief zone, and the ease with which water can crossflow out of the thief zone into the adjacent lower permeability hydrocarbon-containing zones. A polymer microparticle composition designed to incorporate the above considerations results in a better water block after particle expansion, and in a more optimum position in the formation.

In embodiments of this invention, the composition is added to injection water as part of a secondary or tertiary process for the recovery of hydrocarbon from the subterranean formation. In embodiments, the composition is used in a tertiary oil recovery process, one component of which constitutes water injection. In other embodiments of this invention, the injection water is added to the subterranean formation at a temperature lower than the temperature of the subterranean formation.

It should be appreciated that this invention has applicability in any subterranean formation. In an embodiment, the subterranean formation is a sandstone or carbonate hydrocarbon reservoir.

In an embodiment, the diameter of the expanded polymeric microparticles is greater than one tenth of the controlling, pore throat radius of the rock pores in the subterranean formation. In another embodiment, the diameter of the expanded polymeric microparticles is greater than one fourth of the controlling pore throat radius of the rock pores in the subterranean formation.

The present invention has particular applicability for subterranean formations having a neutral or acidic pH. In an embodiment, the present invention is used in a formation having a ph of 7. In other embodiment, the formation has a pH below 7. Preferably, the pH of the formation is in the range of 5-7. In alternative embodiments, the ph of the formation is below 5 or in the range of 4-5.

The polymeric microparticles of the invention may be applied to a subterranean formation as an emulsion, a dry powder, or an aqueous suspension. In an embodiment, the emulsion is a water-in-oil emulsion. In another embodiment, the aqueous suspension is a concentrated aqueous suspension.

In embodiments, the composition of the invention comprises an aqueous medium introduced into the subterranean formation and wherein the aqueous medium includes from about 100 ppm to about 50,000 ppm of the polymeric microparticles, based on total weight of the aqueous medium.

In embodiments, the composition is added in an amount from about 100 to 10,000 ppm, preferably from about 500 to about 1,500 ppm, and more preferably from about 500 to about 1,000 ppm based on polymer actives, based on total volume of fluid injected into the subterranean formation.

In another embodiment, this invention is directed to a method of increasing the mobilization or recovery rate of hydrocarbon fluids in a subterranean formation comprising injecting into the subterranean formation a composition comprising polymeric microparticles as described herein. The microparticles generally have a smaller diameter than the pores of the subterranean formation and the labile cross linkers break under the conditions of temperature and pH in the subterranean formation to decrease the mobility of the composition.

In an embodiment, the composition of this invention is used in a carbon dioxide and water tertiary recovery project. In another embodiment, the composition is added to injection water as part of a secondary or tertiary process for the recovery of hydrocarbon from the subterranean formation.

In another embodiment, the composition and injection water is added to a producing well. Use of the composition of this invention in a producing well increases the oil-to-water ratio of the produced fluid. Fly injecting a composition comprising the polymeric microparticles of this invention and allowing the particles to expand, the water producing zones can be selectively blocked off.

The foregoing may be better understood by reference to the following examples, which are intended for illustrative purposes and are not intended to limit the scope of the invention or its application in any way.

Example 1

This example illustrates inverse emulsion polymerization techniques for synthesizing the polymeric microparticle of this invention. A representative emulsion polymer composition was prepared by polymerizing a monomer emulsion consisting of an aqueous mixture of 408.9 g of 50% acrylamide, 125.1 g of 58% sodium acrylamido methylproprme sulfonate (AMPS), 21.5 g water, 0.2 g versene crystals 0.5 g of 1% solution of methylenebisacrylamide (MBA), 2.4 g of 5% sodium bromate solution, andvaricms levels and types of labile cresslinkers were added to the monomer phase. The monomer phase was dispersed in a mixture of 336 g petroleum distillate, 80 g ethoxylated sorbitol bexaoleate, and 20 g sorbitan sesquioleate as the continuous phase.

The monomer emulsion was prepared by mixing the aqueous phase and the oil phase. After deoxygenation with nitrogen for 30 minutes, polymerization was initiated by using sodium bisulfite/sodium bromate redox pair at room temperature. The temperature of the polymerization is not regulated in general, the heat of polymerization will take the temperature from about 21° C. to about 94 in less than 5 minutes. After the temperature peaked, the reaction mixture was maintained at about 75° C. for an additional 2 hours.

If desired, the polymeric microparticle can be isolated from the latex by precipitating, filtering, and washing with a mixture of acetone and isopropanol. After drying, the oil and surfactant free particle can be redispersed in aqueous media. Tables 1 and 2 list representative emulsion polymers prepared according to the method of this example. The labile crosslinkers listed in Tables 1 and 2 are shown in FIG. 1.

TABLE 1

|  | Exp. 1 | Exp. 2 | Exp. 3 | Exp. 4 |
|---|---|---|---|---|
| 50% Acrylamide | 408.9 | 408.9 | 408.9 | 408.9 |
| 58% Na AMPS | 125.1 | 125.1 | 125.1 | 125.1 |
| DI Water | 21.57 | 21.57 | 21.57 | 21.57 |
| Methylene bisacrylamide (1%) | 0.5 | 0.5 | 0.5 | 0.5 |

TABLE 1-continued

|  | Exp. 1 | Exp. 2 | Exp. 3 | Exp. 4 |
|---|---|---|---|---|
| Labile crosslinker 17 | 2.17 | — | — | — |
| Labile crosslinker 8 | — | 0.27 | — | — |
| Labile crosslinker 22 | — | — | 0.53 | — |
| Labile crosslinker 8 | — | — | — | 0.34 |
| Labile crosslinker 21 | — | — | — | 3.32 |
| Petroleum distillate | 336 | 336 | 336 | 336 |
| Ethoxylated sorbitoal hexaoleate | 80 | 80 | 80 | 80 |
| Sorbitan sesquioleate | 20.1 | 20.1 | 20.1 | 20.1 |

TABLE 2

|  | Exp. 5 | Exp. 6 | Exp. 7 | Exp. 8 |
|---|---|---|---|---|
| 50% Acrylamide | 408.9 | 408.9 | 408.9 | 408.9 |
| 58% Na AMPS | 125.1 | 125.1 | 125.1 | 125.1 |
| DI Water | 21.57 | 21.57 | 21.57 | 21.57 |
| Methylene bisacrylamide (1%) | 0.5 | 0.5 | 0.5 | 0.5 |
| Labile crosslinker 17 | 2.17 | — | — | — |
| Labile crosslinker 8 | — | 0.27 | — | — |
| Labile crosslinker 22 | — | — | 0.53 | — |
| Labile crosslinker 26 | — | — | — | 1.67 |
| Petroleum distillate | 336 | 336 | 336 | 336 |
| Ethoxylated sorbitoal hexaoleate | 80 | 80 | 80 | 80 |
| Sorbitan sesquioleate | 20.1 | 20.1 | 20.1 | 20.1 |

Example 2

The following brine composition was used to study the expansion of the polymer particles. The pH of the brine was set to the indicated pH of 3, 5, or 6 in Tables 3, 4, and 5, respectively, using acetic acid and NaAcetate buffer.

| DI water | 85.10 |
|---|---|
| Inverter surfactant | 0.66 |
| Sodium thiosulfate | 0.15 |
| NaCl | 10.78 |
| CaCl2 2H2O | 0.80 |
| MgCl2 6H2O | 0.45 |
| Na2SO4 anhydrous | 0.56 |
| Acetic Acid | 0.50 |
| NaAcetate | 1.00 |
| total | 100.00 |

1.82 g of polymer was diluted with 98.18 g of brine solution in a 4 oz square bottle. The sample was hand shaken and the viscosity was measured (shown in cP) within the hour to obtain a baseline viscosity reading. All measurements were done with a Brookfiled DV-III ULTRA programmable rheometer at 60 and or 30 rpm using spindle #2c. Samples were placed in an oven at 50 or 70° C. and incubated over several days with 5,000 ppm polymer actives. Samples were taken out periodically and cooled to room temperature and the viscosity was recorded then placed back M the oven for further incubation. Table 3-5 show the activation of the polymeric microparticle using heat. Very minimal expansion was observed with most samples in the first 20 days and rapid expansion thereafter. The particles used in the experiments of Table 3 (pH=3.0, 50° C.) for Exp. 1, 2, 3, 4 correspond to Exp. 5, 6, 7, 8 in Table 2, respectively. The particles used in the experiments of Table 4 (pH=5.0, 50° C.) for Exp. 5, 6, 7, 8 correspond to Exp. 1, 2, 3, 4, in Table 1, respectively. The particles used in the experiments of Table 5 (pH=6.0, 50° C.) for Exp. 9, 10, 11, 12 correspond to Exp. 5, 6, 7, 8 in Table 2, respectively.

TABLE 3

(pH 3.0, 50° C.)

| Day | Exp. 1 | Exp. 2 | Exp. 3 | Exp. 4 |
|---|---|---|---|---|
| 0 | 1 | 0 | 0 | 0.5 |
| 1 | 7 | 0 | 0 | 10 |
| 3 | 10 | 0 | 0 | 18 |
| 7 | 10 | 0 | 0 | 20 |
| 12 | 10 | 0 | 0 | 26 |
| 16 | 10 | 1 | 1 | 32 |
| 21 | 11 | 1 | 1 | 38 |

TABLE 4

(pH 5.0, 50° C.)

| Day | Exp 5 | Exp 6 | Exp 7 | Exp 8 |
|---|---|---|---|---|
| 0 | 2.5 | 1 | 1 | 0.5 |
| 1 | 14 | 2 | 2.5 | 1.5 |
| 6 | 18.5 | 3.5 | 4 | 2.5 |
| 10 | 21 | 3.5 | 4 | 2.5 |
| 16 | 24 | 4 | 4.5 | 3 |
| 23 | 29 | 4.5 | 5 | 4 |
| 31 | 36 | 8 | 8.5 | 5 |
| 38 | 42.5 | 9.5 | 11.5 | 7 |
| 52 | 51 | 16.5 | 19.5 | 13 |
| 59 | 55 | 20 | 23 | 15.5 |
| 77 | 56.5 | 34 | 32 | 26 |
| 82 | 56.5 | 36.5 | 35.5 | 30.5 |
| 91 | 58 | 42.5 | 40 | 34.5 |
| 98 | 56 | 45 | 39 | 34.5 |

TABLE 5

(pH 6.0, 50° C.)

| Day | Exp. 9 | Exp. 10 | Exp. 11 | Exp. 12 |
|---|---|---|---|---|
| 0 | 1 | 0 | 0 | 0 |
| 1 | 7 | 0 | 0 | 17 |
| 3 | 10 | 4 | 6 | 32 |
| 7 | 13 | 14 | 16 | 36 |
| 12 | 26 | 26 | 25 | 40 |
| 16 | 31 | 30 | 27 | 43 |
| 21 | 33 | 30 | 27 | 45 |

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A composition comprising: crosslinked expandable polymeric microparticles having
   (i) an unexpanded volume average particle size diameter from about 0.05 to about 2,000 microns and (ii) a crosslinking agent content from about 50 to about 200,000 ppm of at least one labile crosslinker based on a molar ratio of said polymeric microparticles capable of cleavage, at or below neutral pH and from 0 to about 900 ppm of at least one non-labile crosslinker based on a molar ratio,
   wherein the at least one labile crosslinker is selected from at least one of the following structures 1-26.

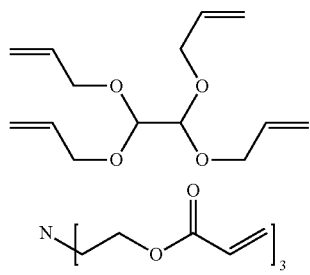

1

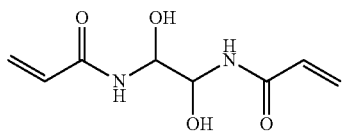

2

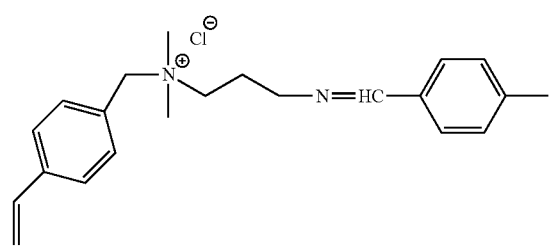

3

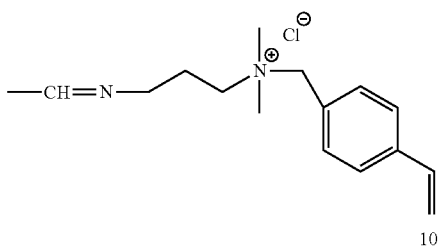

4

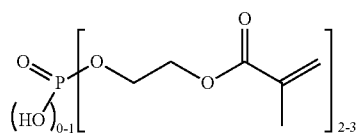

5

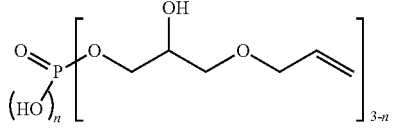

-continued

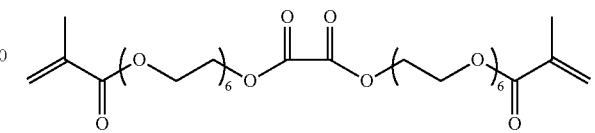

6

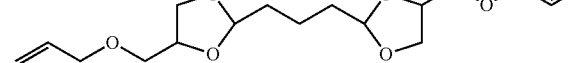

8

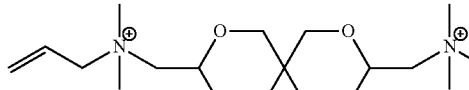

9

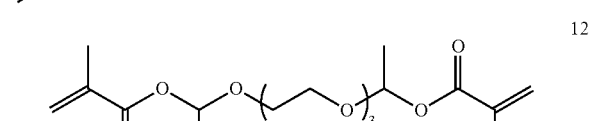

10

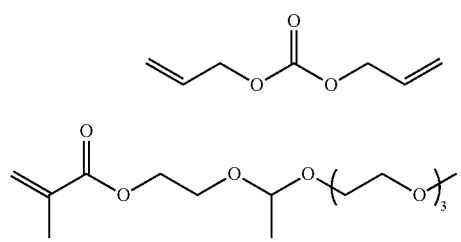

11

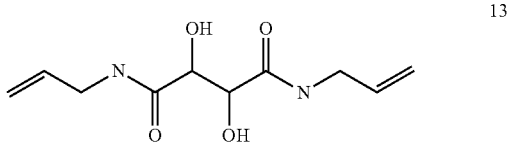

12

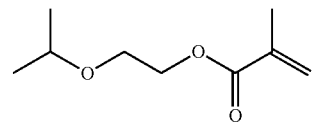

13

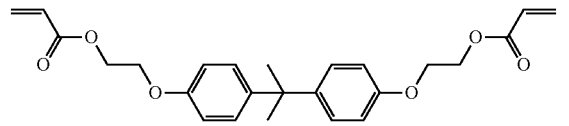

14

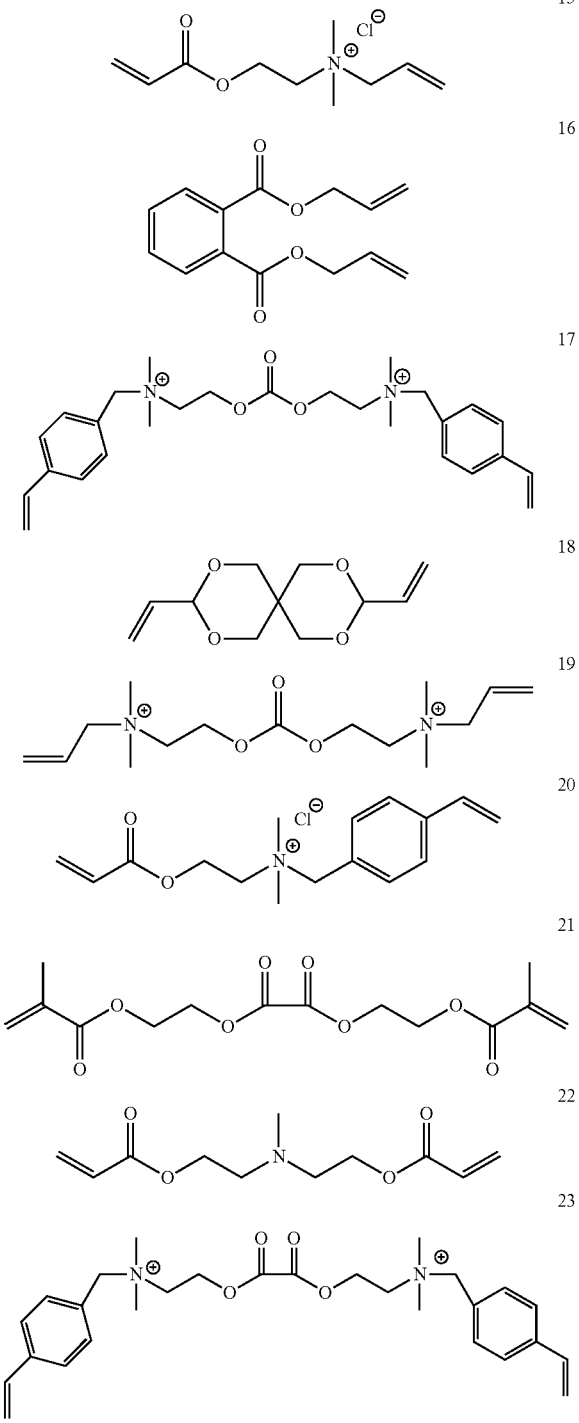
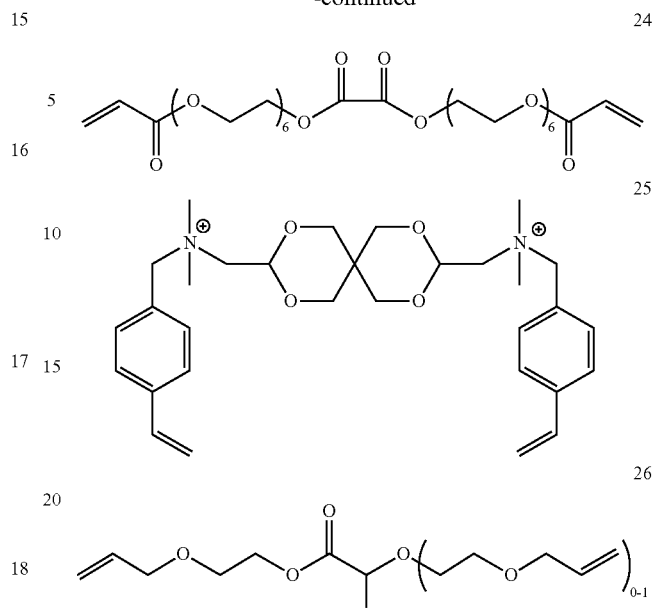

2. The composition of claim 1, wherein at least a portion of the crosslinked expandable polymeric microparticles is highly crosslinked.

3. The composition of claim 1, wherein the unexpanded volume average particle size diameter is from about 0.05 to about 10 microns.

4. The composition of claim 1, wherein the unexpanded volume average particle size diameter is from about 0.05 to about 1 micron.

5. The composition of claim 1, wherein the at least one labile crosslinker comprises a crosslinker with at least two functional sites.

6. The composition of claim 1, wherein the expandable polymeric microparticle comprises at least one of the following properties: anionic, amphoteric, ion-pair, betaine-containing, and combinations thereof.

7. The composition of claim 1, further comprising an emulsion, a dry powder, or an aqueous suspension.

8. The composition of claim 1, wherein the crosslinked expandable polymeric microparticles are prepared by free-radical polymerization from about 95 to about 10 mole percent of nonionic monomers and from about 5 to about 90 mole percent anionic monomers.

9. The composition of claim 7, wherein the anionic monomer is 2-acrylamido-2-methyl-1-propanesulfonic acid and the nonionic monomer is acrylamide.

10. The composition of claim 1, wherein said at or below neutral pH is from about pH 3 to about pH 6.

* * * * *